(12) United States Patent
Huang et al.

(10) Patent No.: US 7,164,959 B2
(45) Date of Patent: Jan. 16, 2007

(54) METHOD AND SYSTEM OF CLASSIFYING DEMAND DATA

(75) Inventors: Chi-Jung Huang, Changhua (TW); Fa-Liang Wang, Hsinchu (TW); Chung-I Liu, Taipei (TW); Ching-I Yeh, Hsinchu (TW)

(73) Assignee: Taiwan Semiconductor Manufacturing Co., Ltd., Hsinchu (TW)

( * ) Notice: Subject to any disclaimer, the term of this patent is extended or adjusted under 35 U.S.C. 154(b) by 514 days.

(21) Appl. No.: 10/646,169

(22) Filed: Aug. 22, 2003

(65) Prior Publication Data

US 2005/0052352 A1    Mar. 10, 2005

(51) Int. Cl.
*G06F 19/00*    (2006.01)
(52) U.S. Cl. .......................... 700/99; 700/106; 705/28
(58) Field of Classification Search ................. 700/99, 700/101, 100, 104, 106, 107; 705/22, 28, 705/29
See application file for complete search history.

(56) References Cited

U.S. PATENT DOCUMENTS

| | | | | |
|---|---|---|---|---|
| 5,548,518 A | * | 8/1996 | Dietrich et al. ............. | 700/100 |
| 5,751,580 A | | 5/1998 | Chi | |
| 5,818,716 A | | 10/1998 | Chin et al. | |
| 5,826,236 A | * | 10/1998 | Narimatsu et al. ............. | 705/8 |
| 5,953,707 A | * | 9/1999 | Huang et al. .................. | 705/10 |
| 6,078,900 A | * | 6/2000 | Ettl et al. ...................... | 705/28 |
| 6,119,102 A | * | 9/2000 | Rush et al. .................... | 705/29 |
| 6,167,380 A | * | 12/2000 | Kennedy et al. .............. | 705/10 |
| 6,434,443 B1 | | 8/2002 | Lin | |
| 6,470,231 B1 | | 10/2002 | Yang et al. | |
| 6,898,472 B1 | * | 5/2005 | Crampton et al. ............ | 700/97 |
| 2001/0020230 A1 | * | 9/2001 | Kaneko et al. ................ | 705/8 |
| 2003/0065415 A1 | * | 4/2003 | Hegde et al. ................ | 700/100 |
| 2004/0267396 A1 | * | 12/2004 | Coppola et al. ............ | 700/105 |
| 2005/0203655 A1 | * | 9/2005 | Tsai ............................ | 700/101 |

FOREIGN PATENT DOCUMENTS

TW    526529    4/2003
TW    541483    7/2003

OTHER PUBLICATIONS

Taiwan Office Action mailed Oct. 26, 2006.
Singapore Office Action mailed Sep. 27, 2006.

* cited by examiner

*Primary Examiner*—Albert W. Paladini
(74) *Attorney, Agent, or Firm*—Thomas, Kayden, Horstemeyer & Risley (57) ABSTRACT

A method of classifying demand for an allocation term. The inventive method first inputs demand data, order data, and supply data. The method then classifies the demand data into prioritized demand data according to the order data and the supply data. The method finally combines and outputs the first, second, and third priority demand data, and updates the supply data according to the first, second, and third demand data.

41 Claims, 6 Drawing Sheets

METHOD AND SYSTEM OF CLASSIFYING DEMAND DATA

BACKGROUND OF THE INVENTION

1. Field of the Invention

The present invention relates to an allocation planning technology, and in particular to a computer-implemented method of classifying demand data for one allocation term (e.g., one month).

2. Description of the Related Art

In factory management, a demand plan is usually requested over a long time, such as one year or 18 months. A demand plan may be divided into many terms, each term having its own demand data. As an example, an 18-month demand plan of one month terms contains demand data for each term. Generally speaking, the supply manufacturer produces a supply plan corresponding to the demand plan for supply capacity management. The supply plan includes supply data corresponding to the demand data of the demand plan.

Because many variables may appear in the duration of the supply plan, the supply plan should be examined each term, such as once a month, to ensure that it can be maintained. If any exceptions occur, such as unexpected machine shutdown or a wrong recipe applied in a working tool, the supply manufacturer must respond to maintain the supply plan. Especially in the currently-competitive market, the maintenance of a supply plan directly impacts quality of service, and, thereby customer satisfaction.

The goals of maintaining a supply plan is to satisfy orders totally, to satisfy demand data if possible, and distinguish the exceeding part of supply data from demand data. That is to say, demand data should be prioritized for better utilization of further capacity management.

Presently, commercial supply plans do not reflect or embody these priorities. Instead, supply plans generally consider only current demand and order data, while ignoring the relative information. Consequently, commercial supply plan applications generally are not suitable for long-term factory management, especially for a manufacturer with a supply plan of multiple considerable phases, such as IC manufacturers or airline companies.

U.S. Pat. No. 6,393,332 discloses a method and system for providing sufficient availability of manufacturing resources to meet unanticipated demand. The method considers the relationship between an order and a manufacturing plan and attempts to fulfill the order by changing the manufacturing plan. However, the method disclosed focuses on the demand plan daily arrangement, not suitable for manufacturers with long-term, complex supply plans, such as IC manufacturers.

SUMMARY

Accordingly, an object of the invention is to provide a method of classifying demand data into different prioritized classes. The prioritized demand data can be applied to further utilization, such as capacity management. The inventive method is applied each term to examine demand data, order data, and supply data, thus maintaining a supply plan.

To achieve the foregoing and other objects, the invention is directed to novel systems and methods for overcoming conventional supply plan deviation problems. The method inputs demand data, order data, and supply data. The demand data and order data refer to one allocation term (e.g., one month). The supply data includes month information. The method then classifies the demand data into prioritized demand data. The number of the prioritized classes is dependent upon the actual request. In addition, the method combines and outputs the prioritized demand data and updates the supply data for further utilization.

BRIEF DESCRIPTION OF THE DRAWINGS

The present invention can be more fully understood by reading the following detailed description and examples with references made to the accompanying drawings, wherein.

DETAILED DESCRIPTION OF EMBODIMENTS OF THE INVENTION

As summarized above, the present invention is directed to novel systems and methods for overcoming conventional supply plan deviation problems. In one embodiment, the inventive method first inputs the demand data for one allocation term (e.g., one month), order data of the allocation term, and supply data. The demand data includes demand amounts, corresponding demand factories, and corresponding demand manufacturing technologies. The order data includes order amounts, corresponding order factories, and corresponding order manufacturing technologies. The supply data includes supply amounts, corresponding supply factories, corresponding supply manufacturing technologies, and corresponding supply terms.

As noted above, the allocation term may be one month. However, consistent with the invention, the allocation term may be a period of time more or less than one month as well. Further still, the embodiments described herein have generally been described with reference to a single allocation term. However, as will be appreciated by persons skilled in the art, the concepts of the invention are readily applicable to a plurality of allocation terms as well.

For example, in an IC manufacturer, if the allocation term is one month, such as 2004 April, the demand data can be a list of customers' demands of the month, including product names, amounts, foundries, and manufacturing technologies. Here, because different foundries may support the same manufacturing technology, e.g. sputtering, the customers can designate preference foundries in the list. Similarly, one manufacturing process may be accomplished by different manufacturing technology, e.g. different technology of sputtering, the preference manufacturing technology can be designated in the list too. The order data and the supply data are similar to the demand data. The supply data is from the view of the manufacturer, considering the preference foundries and manufacturing technology of manufacturer.

In accordance with one embodiment, a portion of the demand data, belonging to the order data, is designated as first priority demand data. The first priority demand data assignment is accomplished by several comparisons between order data and the demand data according to the different conditions of the amount, the factory, and the manufacturing technology. First, the same order amount and demand amount, the same order factory and demand factory, and the same order manufacturing technology and demand manufacturing technology are considered. Next, the order data and the demand data are compared according to the same order amount and demand amount, the different order factory and demand factory, and the same order manufacturing technology and demand manufacturing technology. Finally, the order data and the demand data are compared according to the same order amount and demand amount, the same order factory and demand factory, and the different order manufacturing technology and demand manufacturing technology.

Carrying on, a portion of the demand data, not belonging to the order data may be designated as unfinished demand data. A portion of the supply data, not belonging to the order data, may be designated as unfinished supply data.

A portion of the unfinished demand data, belonging to the unfinished supply data, is then designated as second priority demand data. Similarly, the second priority demand data assignment is also accomplished by several comparisons. The assignment compares the unfinished demand data and the unfinished supply data according to the same or different situations of the demand and supply amount, the demand and supply factory, the demand and supply manufacturing technology, and the supply term and allocation term.

Finally, a portion of the unfinished demand data not belonging to the unfinished supply data is designated as third priority demand data. Here, the third priority demand data assignment is the same as the second priority demand data assignment, divided into a pair of comparisons and considering different situations of the demand and supply amount, the demand and supply factory, the demand and supply manufacturing technology, and the supply term and allocation term.

In addition, the method may combine and output the first, second, and third priority demand data after the mentioned steps. The method also updates the supply data according to the first, second, and third priority demand data.

The prioritized demand data can be provided for further utilization, such as capacity allocation planning. The mentioned method accomplishes the main idea of maintaining a supply plan, that is, the order data should be totally fulfilled, the demand data promised by the supply plan should be kept at a lower priority than the order data, and the demand data exceeding the supply plan should carry the lowest priority. In this way, the inventive method resolves conventional problems, such as unexpected operation errors and sharp order amount changing.

One embodiment of the invention is directed to a storage medium for storing a computer program providing a method of classifying demand data for one allocation term. The method may include the steps mentioned above.

Another embodiment is directed to a system of classifying demand data for one allocation term. The system includes a demand database, a supply database, a customer interface, and a controller computer.

The demand database stores the demand data and the supply database stores supply data. The customer interface enables input of order data of the allocation term. The controller computer is paired to the demand database, the supply database, and the customer interface. The controller computer classifies the demand data into prioritized demand data according to the order data and the supply data.

The controller computer classifies the demand data by data assignment. First, the controller computer designates a portion of the demand data, belonging to the order data, as first priority demand data. Next, the controller computer designates a portion of the demand data, not belonging to the order data, as unfinished demand data and a portion of the supply data, not belonging to the order data, as unfinished supply data. The controller computer then designates a portion of the unfinished demand data, belonging to the unfinished supply data, as second priority demand data, and designating a portion of the unfinished demand data, not belonging to the unfinished supply data, as third priority demand data.

The detailed steps of the first, second, and third priority demand data assignment are similar to the detailed comparisons in the method summarized above.

Another embodiment of the invention is directed to a system of demand and capacity management. The system includes an allocation planning module, a capacity model, and a capacity management module. The allocation planning module receives demand data for one allocation term, order data of the allocation term, and supply data. The capacity model has route information for the product, wherein the route information records tools. The capacity management module reserves capacity according to the demand data and the route information.

The allocation planning module includes a data input module and a classifying module. The allocation planning module performs the functions provided by the method mentioned.

The system can be applied to supply chain management for a manufacturer. The allocation planning module is the first part of the supply chain management. The allocation planning module handles the demand data and maintains the supply plan for the duration of the supply plan. As an example, the result obtained by the allocation planning module may be distributed to the factories for accomplishing costumers' demands.

Figure 1:
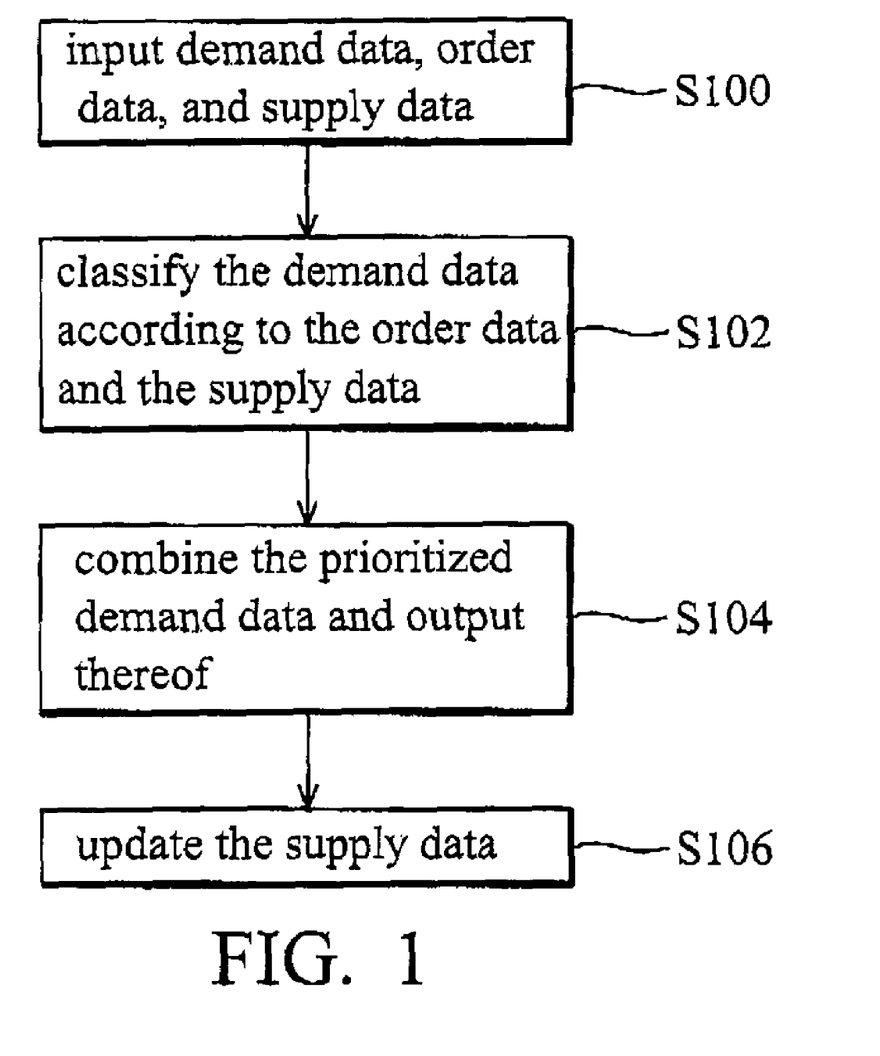
FIG. 1 is a flowchart of the computer-implemented method of classifying demand data for one allocation term.

FIG. 1 is a flowchart of a computer-implemented method of classifying demand data for one allocation term. In one embodiment, the demand data for one allocation term, order data of the allocation term, and supply data are first input (step S100).

Next, the demand data is classified into prioritized demand data according to the order data and the supply data (step S102).

Afterwards, the prioritized demand data are combined and output (step S104), and the supply data is updated thereafter (step S106).

The demand data may include demand amounts, demand factories, and demand manufacturing technologies. The demand factories and the demand manufacturing technologies are paired with the demand amounts. The order data includes order amounts, corresponding order factories, and corresponding order manufacturing technologies. The supply data includes supply amounts, supply factories, supply manufacturing technologies, and supply terms. The supply factories, the supply manufacturing technologies, and the supply terms all correspond to the supply amounts as well.

Figure 2:
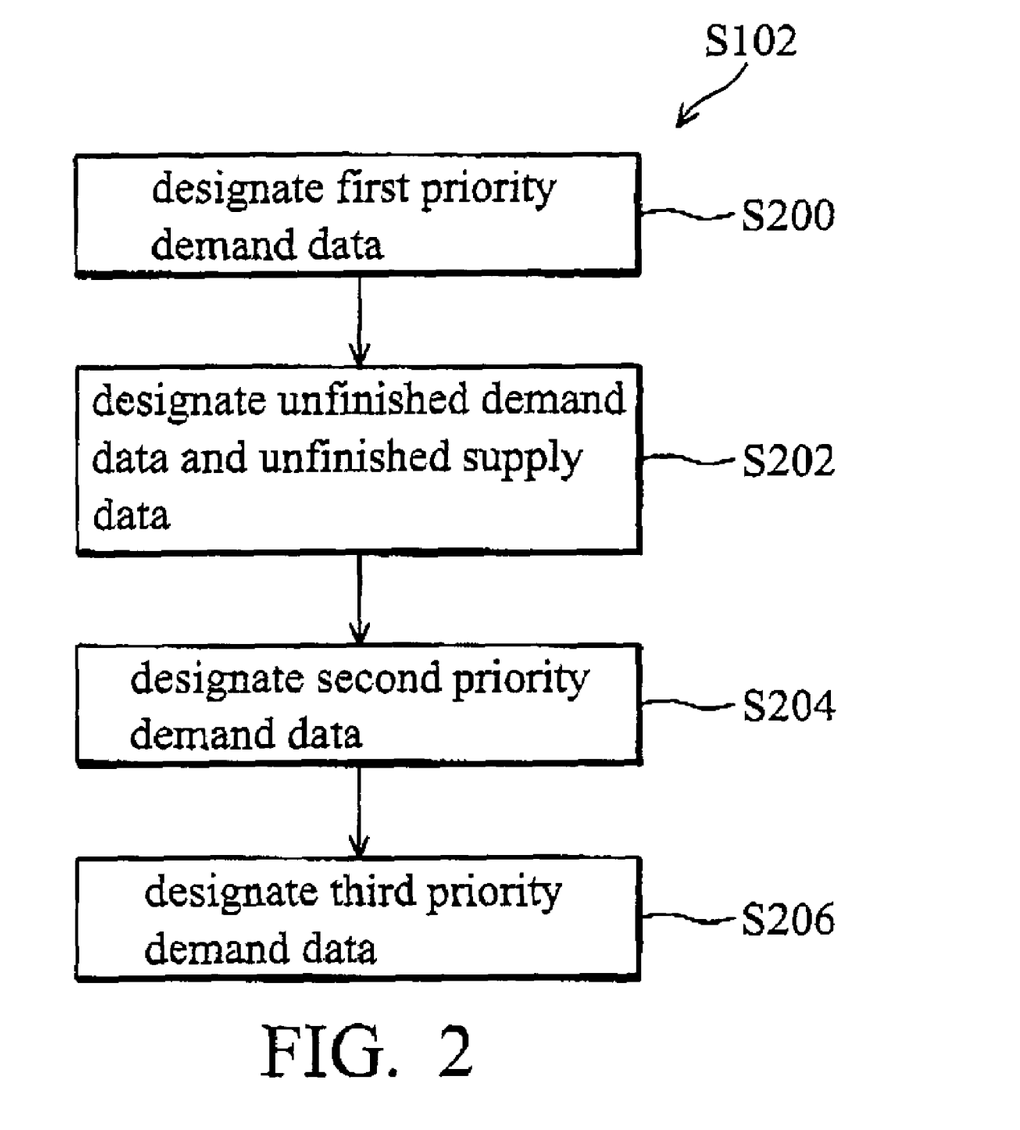
FIG. 2 is a flowchart of detailed steps of the classification step of one embodiment.

The classification step (step S102) of FIG. 1 can be subdivided into several sub-steps. FIG. 2 is a flowchart of detailed steps of the classification step of FIG. 1. First, a portion of the demand data, belonging to the order data, is designated as first priority demand data (step S200). This portion may be designated in the manner described above.

Next, a portion of the demand data, not belonging to the order data, is designated as unfinished demand data. A portion of the supply data, not belonging to the order data, is designated as unfinished supply data (step S202).

Afterwards, a portion of the unfinished demand data, belonging to the unfinished supply data, is designated as second priority demand data (step S204).

Finally, a portion of the unfinished demand data not belonging to the unfinished supply data is designated as third priority demand data (step S206).

Figure 3A:
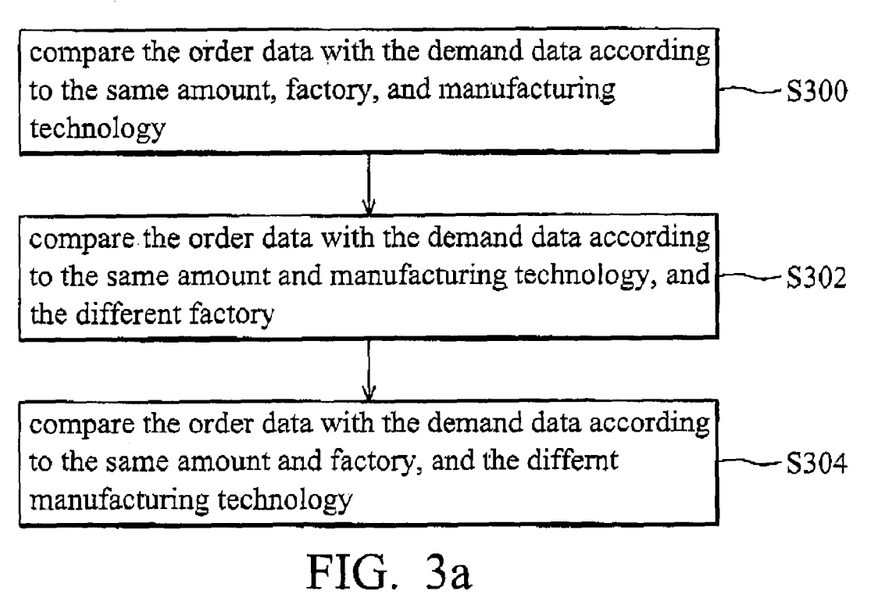
FIG. 3a is a flowchart of detailed steps of the assignment step of the method.

FIG. 3a is a flowchart of detailed steps of the assignment step of one embodiment. The first priority demand data assignment is finished by certain comparisons. First, the assignment compares the order data and the demand data according to the same order amount and demand amount, the same order factory and demand factory, and the same order manufacturing technology and demand manufacturing technology (step S300).

The assignment then compares the order data and the demand data according to the same order amount and demand amount, the different order factory and demand factory, and the same order manufacturing technology and demand manufacturing technology (step S302).

Finally, the assignment is terminated by comparing the order data and the demand data according to the same order amount and demand amount, the same order factory and demand factory, and the different order manufacturing technology and demand manufacturing technology (step S304).

The above comparisons are constructed of considering the related items, such as amount, factory, and manufacturing technology. The ideal situation is all the items matched, thus the order or demand is fully satisfied. If the items are not all matched, the items will be considered one by one for matching, trying to fulfill the order and demand.

Figure 3B:
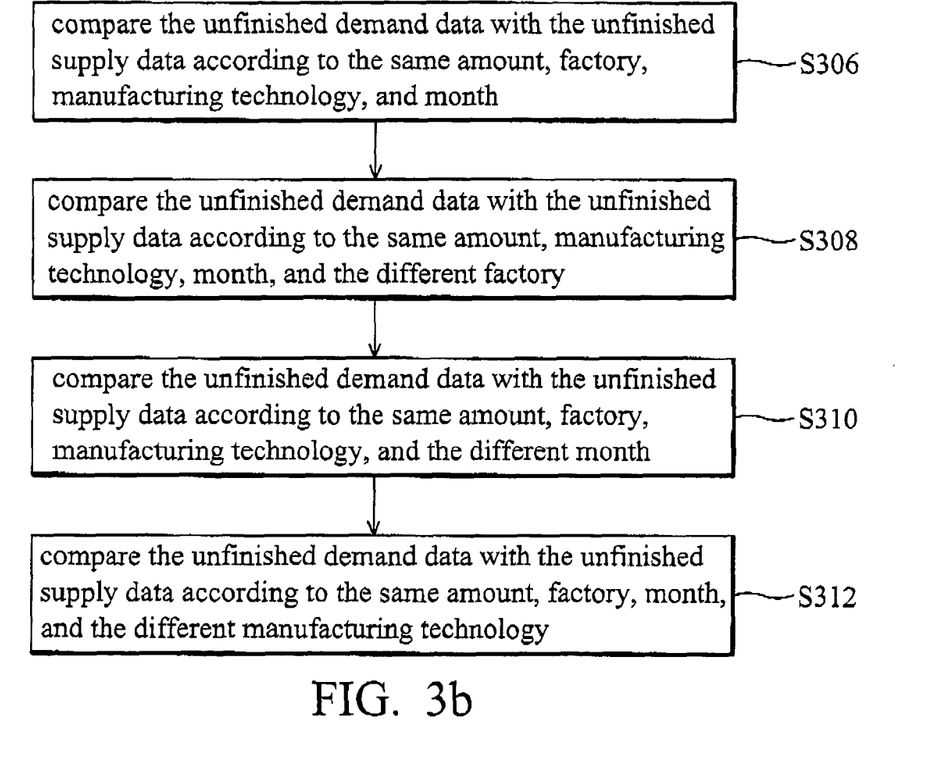
FIG. 3b is a flowchart of detailed steps of the assignment step of one embodiment.

FIG. 3b is a flowchart of detailed steps of the assignment step of FIG. 3a. The second and third priority demand data designations are also accomplished by several comparisons. The designations compare the unfinished demand data and the unfinished supply data according to the same demand amount and supply amount, the same demand factory and supply factory, the same demand manufacturing technology and supply manufacturing technology, and the same supply term and allocation term (step S306).

The designations then compare the unfinished demand data and the unfinished supply data according to the same demand amount and supply amount, the different demand factory and supply factory, the same demand manufacturing technology and supply manufacturing technology, and the same supply term and allocation term (step S308).

The designations compare the unfinished demand data and the unfinished supply data according to the same demand amount and supply amount, the same demand factory and supply factory, the same demand manufacturing technology and supply manufacturing technology, and the different supply term and allocation term (step S310).

Finally, the designations compare the unfinished demand data and the unfinished supply data according to the same demand amount and supply amount, the same demand factory and supply factory, the different demand manufacturing technology and supply manufacturing technology, and the same supply term and allocation term (step S312).

Figure 4:
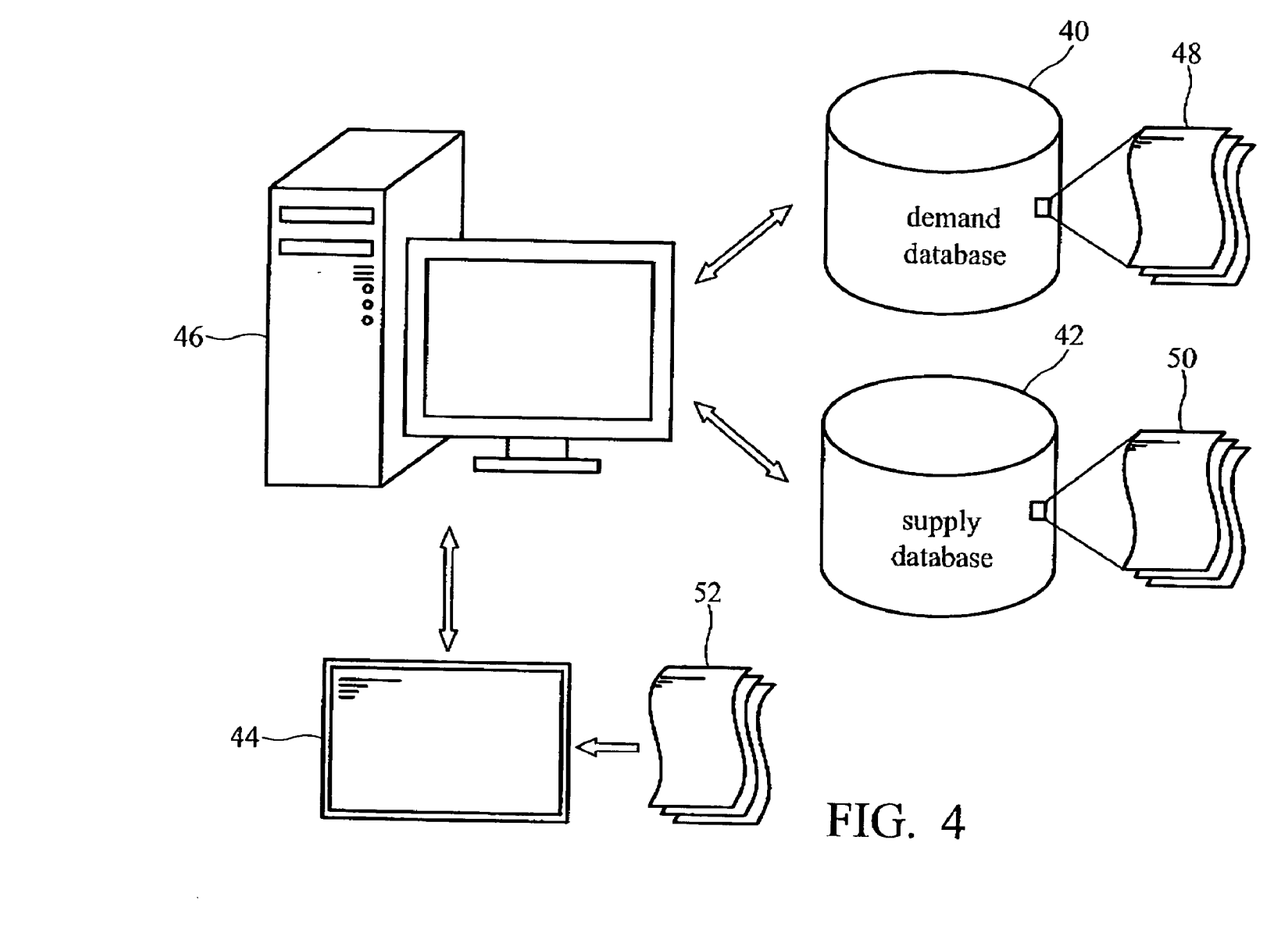
FIG. 4 is a diagram of the system for classifying demand data for one allocation term.

FIG. 4 is a diagram of the system for classifying demand data for one allocation term. The system includes a demand database 40, a supply database 42, a customer interface 44, and a controller computer 46.

The demand database 40 stores demand data 48 for one allocation term and the supply database 42 stores supply data 50. The customer interface 44 enables input of order data 52 of the allocation term.

The controller computer 46, paired to the demand database 40, the supply database 42, and the customer interface 44, classifies the demand data 48 into prioritized demand data according to the order data 52 and the supply data 50.

The controller computer 46 classifies the demand data 48 by certain designations. The controller computer designates a portion of the demand data 48, belonging to the order data 52, as first priority demand data. The controller computer 46 designates a portion of the demand data 48, not belonging to the order data 52, as unfinished demand data and a portion of the supply data 50, not belonging to the order data 52, as unfinished supply data. The controller computer designates a portion of the unfinished demand data, belonging to the unfinished supply data, as second priority demand data, and designates a portion of the unfinished demand data, not belonging to the unfinished supply data, as third priority demand data.

The first, second, and third priority demand data designations are individually comprised of several comparisons according to the different conditions of the order data and the supply data, such as the same or different amount, factory, manufacturing technology, and term.

Figure 5:
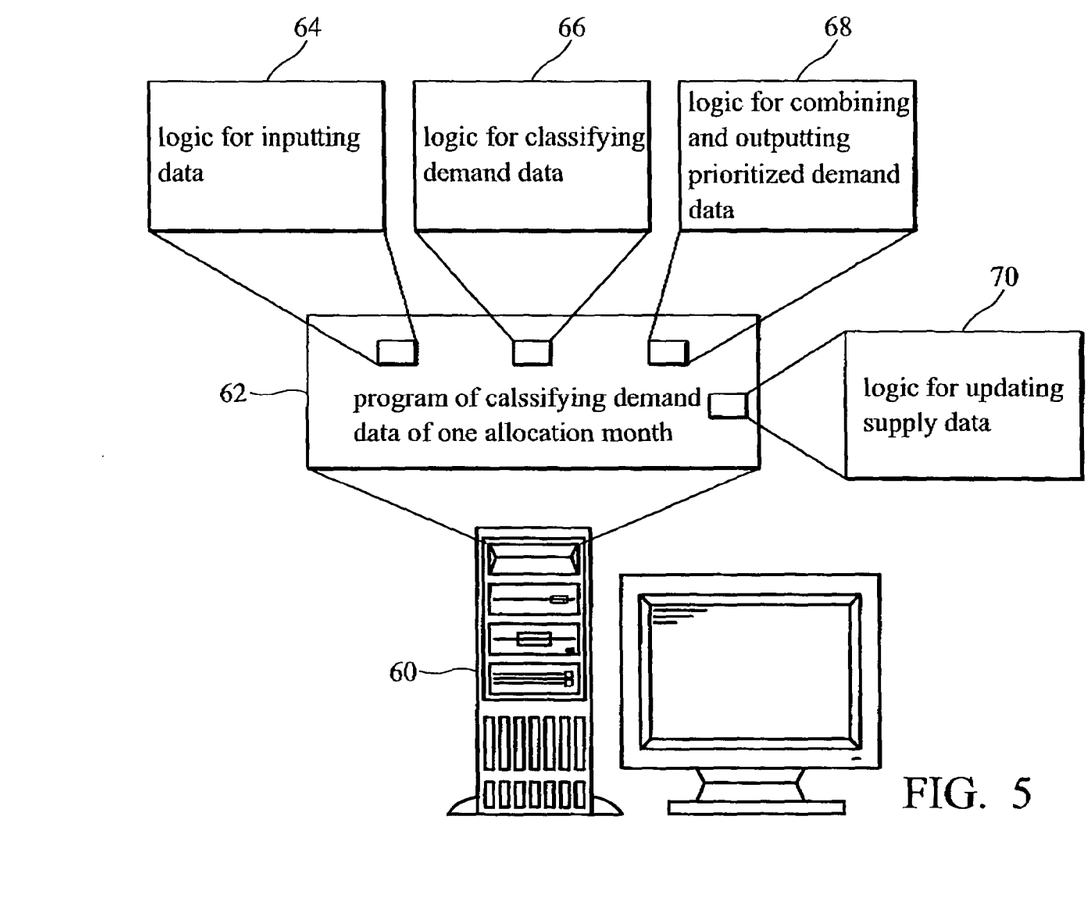
FIG. 5 is a diagram of the storage medium for storing a computer program providing a method of classifying demand data for one allocation term.

FIG. 5 is a diagram of the storage medium for storing a computer program providing a method of classifying demand data for one allocation term. The storage medium 60 stores a computer program 62. The computer program 62 provides a method of classifying demand data for one allocation term. The program mainly includes logic for inputting data 64, logic for classifying demand data 66, logic for combining and outputting prioritized demand data 68, and logic for updating supply data 70.

Thus, a method of classifying demand data for one allocation term is provided by embodiments of the invention. The disclosed method utilizes the order data and the supply data to classify the demand data for maintaining the promised supply amount in the duration of a supply plan, solving the conventional problems. The inventive method is specifically useful in high technology-related fields, such as an IC manufacturer, presenting significant advantages in supply plan management.

It will be appreciated from the foregoing description that the system and method described herein provide a dynamic and robust solution to the supply plan maintaining problem. If, for example, there is an promised supply plan between the manufacturer and the customer, the system and method of the present invention can revise the prioritized demand data into more classes to satisfy the supply plan.

The methods and system of the present invention, or certain aspects or portions thereof, may take the form of program code (i.e., instructions) embodied in tangible media, such as floppy diskettes, CD-ROMS, hard drives, or any other machine-readable storage medium, wherein, when the program code is loaded into and executed by a machine, such as a computer, the machine becomes an apparatus for practicing the invention. The methods and apparatus of the present invention may also be embodied in the form of program code transmitted over some transmission medium, such as electrical wiring or cabling, through fiber optics, or via any other form of transmission, wherein, when the program code is received and loaded into and executed by a machine, such as a computer, the machine becomes an apparatus for practicing the invention. When implemented on a general-purpose processor, the program code combines with the processor to provide a unique apparatus that operates analogously to specific logic circuits.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A computer-implemented method of classifying demand data for at least one allocation term, comprising using a computer to perform the steps of:
   - inputting the demand data, order data of the allocation term, and supply data; and
   - classifying the demand data into prioritized demand data according to the order data and the supply data.

2. The computer-implemented method of classifying demand data for at least one allocation term as claimed in claim 1, further comprising the steps of:
   - combining and outputting the prioritized demand data; and
   - updating the supply data according to the prioritized demand data.

3. The computer-implemented method of classifying demand data for at least one allocation term as claimed in claim 1, wherein the classification step further comprises the steps of:
   - designating a portion of the demand data, belonging to the order data, as first priority demand data;
   - designating a portion of the demand data, not belonging to the order data, as unfinished demand data and a portion of the supply data, not belonging to the order data, as unfinished supply data;
   - designating a portion of the unfinished demand data, belonging to the unfinished supply data, as second priority demand data; and
   - designating a portion of the unfinished demand data, not belonging to the unfinished supply data, as third priority demand data.

4. The computer-implemented method of classifying demand data for at least one allocation term as claimed in claim 1, wherein the demand data has at least one demand amount, at least one demand factory, and at least one demand manufacturing technology, the demand factory and the demand manufacturing technology corresponding to the demand amount.

5. The computer-implemented method of classifying demand data for at least one allocation term as claimed in claim 1, wherein the order data has at least one order amount, at least one order factory, and at least one order manufacturing technology, the order factory and the order manufacturing technology corresponding to the order amount.

6. The computer-implemented method of classifying demand data for at least one allocation term as claimed in claim 1, wherein the supply data has at least one supply amount, at least one supply factory, at least one supply manufacturing technology, and at least one supply term, the supply factory, the supply manufacturing technology, and the supply term corresponding to the supply amount.

7. The computer-implemented method of classifying demand data for at least one allocation term as claimed in claim 3, wherein the step of designating the first priority demand data further comprises the steps of:
   - comparing the order data with the demand data according to the same order amount and demand amount, the same order factory and demand factory, and the same order manufacturing technology and demand manufacturing technology;
   - comparing the order data with the demand data according to the same order amount and demand amount, the different order factory and demand factory, and the same order manufacturing technology and demand manufacturing technology; and
   - comparing the order data with the demand data according to the same order amount and demand amount, the same order factory and demand factory, and the different order manufacturing technology and demand manufacturing technology.

8. The computer-implemented method of classifying demand data for at least one allocation term as claimed in claim 3, wherein the step of designating the second priority demand data further comprises the steps of:
   - comparing the unfinished demand data with the unfinished supply data according to the same demand amount and supply amount, the same demand factory and supply factory, the same demand manufacturing technology and supply manufacturing technology, and the same supply term and allocation term;
   - comparing the unfinished demand data with the unfinished supply data according to the same demand amount and supply amount, the different demand factory and supply factory, the same demand manufacturing technology and supply manufacturing technology, and the same supply term and allocation term;
   - comparing the unfinished demand data with the unfinished supply data according to the same demand amount and supply amount, the same demand factory and supply factory, the same demand manufacturing technology and supply manufacturing technology, and the different supply term and allocation term; and
   - comparing the unfinished demand data with the unfinished supply data according to the same demand amount and supply amount, the same demand factory and supply factory, the different demand manufacturing technology and supply manufacturing technology, and the same supply term and allocation term.

9. The computer-implemented method of classifying demand data for at least one allocation term as claimed in claim 3, wherein the step of designating the third priority demand data further comprises the steps of:
   - comparing the unfinished demand data with the unfinished supply data according to the same demand amount and supply amount, the same demand factory and supply factory, the same demand manufacturing technology and supply manufacturing technology, and the same supply term and allocation term;
   - comparing the unfinished demand data and the unfinished supply data according to the same demand amount and supply amount, the different demand factory and supply factory, the same demand manufacturing technology and supply manufacturing technology, and the same supply term and allocation term;
   - comparing the unfinished demand data and the unfinished supply data according to the same demand amount and supply amount, the same demand factory and supply factory, the same demand manufacturing technology and supply manufacturing technology, and the different supply term and allocation term; and
   - comparing the unfinished demand data and the unfinished supply data according to the same demand amount and supply amount, the same demand factory and supply factory, the different demand manufacturing technology and supply manufacturing technology, and the same supply term and allocation term.

10. A storage medium for storing a computer program providing a method of classifying demand data for an allocation term, the method comprising the steps of:
inputting the demand data, order data of the allocation term, and supply data; and
classifying the demand data into prioritized demand data according to the order data and the supply data.

11. The storage medium as claimed in claim 10, further comprising the steps of:
combining and outputting the prioritized demand data; and
updating the supply data according to the prioritized demand data.

12. The storage medium as claimed in claim 10, wherein the classification step further comprises the steps of:
designating a portion of the demand data, belonging to the order data, as first priority demand data;
designating a portion of the demand data, not belonging to the order data, as unfinished demand data and a portion of the supply data, not belonging to the order data, as unfinished supply data;
designating a portion of the unfinished demand data, belonging to the unfinished supply data, as second priority demand data; and
designating a portion of the unfinished demand data, not belonging to the unfinished supply data, as third priority demand data.

13. The storage medium as claimed in claim 10, wherein the demand data has at least one demand amount, at least one demand factory, and at least one demand manufacturing technology, the demand factory and the demand manufacturing technology corresponding to the demand amount.

14. The storage medium as claimed in claim 10, wherein the order data has at least one order amount, at least one order factory, and at least one order manufacturing technology, the order factory and the order manufacturing technology corresponding to the order amount.

15. The storage medium as claimed in claim 10, wherein the supply data has at least one supply amount, at least one supply factory, at least one supply manufacturing technology, and at least one supply term, the supply factory, the supply manufacturing technology, and the supply term corresponding to the supply amount.

16. The storage medium as claimed in claim 12, wherein the step of designating the first priority demand data further comprises the steps of:
comparing the order data with the demand data according to the same order amount and demand amount, the same order factory and demand factory, and the same order manufacturing technology and demand manufacturing technology;
comparing the order data with the demand data according to the same order amount and demand amount, the different order factory and demand factory, and the same order manufacturing technology and demand manufacturing technology; and
comparing the order data with the demand data according to the same order amount and demand amount, the same order factory and demand factory, and the different order manufacturing technology and demand manufacturing technology.

17. The storage medium as claimed in claim 12, wherein the step of designating the second priority demand data farther comprises the steps of:
comparing the unfinished demand data with the unfinished supply data according to the same demand amount and supply amount, the same demand factory and supply factory, the same demand manufacturing technology and supply manufacturing technology, and the same supply term and allocation term;
comparing the unfinished demand data with the unfinished supply data according to the same demand amount and supply amount, the different demand factory and supply factory, the same demand manufacturing technology and supply manufacturing technology, and the same supply term and allocation term;
comparing the unfinished demand data with the unfinished supply data according to the same demand amount and supply amount, the same demand factory and supply factory, the same demand manufacturing technology and supply manufacturing technology, and the different supply term and allocation term; and
comparing the unfinished demand data with the unfinished supply data according to the same demand amount and supply amount, the same demand factory and supply factory, the different demand manufacturing technology and supply manufacturing technology, and the same supply term and allocation term.

18. The storage medium as claimed in claim 12, wherein the step of designating the third priority demand data further comprises the steps of:
comparing the unfinished demand data with the unfinished supply data according to the same demand amount and supply amount, the same demand factory and supply factory, the same demand manufacturing technology and supply manufacturing technology, and the same supply term and allocation term;
comparing the unfinished demand data with the unfinished supply data according to the same demand amount and supply amount, the different demand factory and supply factory, the same demand manufacturing technology and supply manufacturing technology, and the same supply term and allocation term;
comparing the unfinished demand data with the unfinished supply data according to the same demand amount and supply amount, the same demand factory and supply factory, the same demand manufacturing technology and supply manufacturing technology, and the different supply term and allocation term; and
comparing the unfinished demand data with the unfinished supply data according to the same demand amount and supply amount, the same demand factory and supply factory, the different demand manufacturing technology and supply manufacturing technology, and the same supply term and allocation term.

19. A system of classifying demand data for an allocation term, comprising:
a demand database, storing the demand data;
a supply database, storing supply data;
a customer interface, enabling input of order data of the allocation term; and
a controller computer, paired to the demand database, the supply database, and the customer interface, classifying the demand data into prioritized demand data according to the order data and the supply data.

20. The system of classifying demand data for an allocation term as claimed in claim 19, wherein the controller computer further combines and outputs the prioritized demand data and the controller computer further updates the supply data according to the prioritized demand data.

21. The system of classifying demand data for an allocation term as claimed in claim 19, wherein the controller computer farther designates a portion of the demand data belonging to the order data as first priority demand data, designates a portion of the demand data, not belonging to the order data, as unfinished demand data and a portion of the supply data, not belonging to the order data, as unfinished supply data, and farther designates a portion of the unfinished demand data, belonging to the unfinished supply data, as second priority demand data, and a portion of the unfinished demand data, not belonging to the unfinished supply data, as third priority demand data.

22. The system of classifying demand data for an allocation term as claimed in claim 19, wherein the demand data has at least one demand amount, at least one demand factory, and at least one demand manufacturing technology, the demand factory and the demand manufacturing technology corresponding to the demand amount.

23. The system of classifying demand data for an allocation term as claimed in claim 19, wherein the order data has at least one order amount, at least one order factory, and at least one order manufacturing technology, the order factory and the order manufacturing technology corresponding to the order amount.

24. The system of classifying demand data for an allocation term as claimed in claim 19, wherein the supply data has at least one supply amount, at least one supply factory, at least one supply manufacturing technology, and at least one supply term, the supply factory, the supply manufacturing technology, and the supply term corresponding to the supply amount.

25. The system of classifying demand data for an allocation term as claimed in claim 21, wherein the controller computer further compares the order data with the demand data according to the same order amount and demand amount, the same order factory and demand factory, and the same order manufacturing technology and demand manufacturing technology, further compares the order data with the demand data according to the same order amount and demand amount, the different order factory and demand factory, and the same order manufacturing technology and demand manufacturing technology, and even further compares the order data with the demand data according to the same order amount and demand amount, the same order factory and demand factory, and the different order manufacturing technology and demand manufacturing technology.

26. The system of classifying demand data for an allocation term as claimed in claim 21, wherein the controller computer further compares the unfinished demand data with the unfinished supply data according to the same demand amount and supply amount, the same demand factory and supply factory, the same demand manufacturing technology and supply manufacturing technology, and the same supply term and allocation term, further compares the unfinished demand data with the unfinished supply data according to the same demand amount and supply amount, the different demand factory and supply factory, the same demand manufacturing technology and supply manufacturing technology, and the same supply term and allocation term, and even further compares the unfinished demand data with the unfinished supply data according to the same demand amount and supply amount, the same demand factory and supply factory, the same demand manufacturing technology and supply manufacturing technology, and the different supply term and allocation term, and finally compares the unfinished demand data with the unfinished supply data according to the same demand amount and supply amount, the same demand factory and supply factory, the different demand manufacturing technology and supply manufacturing technology, and the same supply term and allocation term.

27. The system of classifying demand data for an allocation term as claimed in claim 21, wherein the controller computer further compares the unfinished demand data with the unfinished supply data according to the same demand amount and supply amount, the same demand factory and supply factory, the same demand manufacturing technology and supply manufacturing technology, and the same supply term and allocation term, further compares the unfinished demand data with the unfinished supply data according to the same demand amount and supply amount, the different demand factory and supply factory, the same demand manufacturing technology and supply manufacturing technology, and the same supply term and allocation term, and further compares the unfinished demand data with the unfinished supply data according to the same demand amount and supply amount, the same demand factory and supply factory, the same demand manufacturing technology and supply manufacturing technology, and the different supply term and allocation term, and finally compares the unfinished demand data with the unfinished supply data according to the same demand amount and supply amount, the same demand factory and supply factory, the different demand manufacturing technology and supply manufacturing technology, and the same supply term and allocation term.

28. A system of demand and capacity management, comprising:
   an allocation planning module to receive demand data for one allocation term, order data of the allocation term, and supply data;
   a capacity model having route information for the product, wherein the route information records a plurality of tools; and
   a capacity management module to reserve capacity according to the demand data and the route information.

29. The system as claimed in claim 28, wherein the allocation planning module further comprises:
   a data input module, inputting the demand data, order data of the allocation term, and supply data; and
   a classifying module, classifying the demand data into prioritized demand data according to the order data and the supply data.

30. The system as claimed in claim 29, wherein the allocation module further comprises:
   a combining module, combining and outputting the prioritized demand data; and
   a updating module, updating the supply data according to prioritized demand data.

31. The system as claimed in claim 29, wherein the classifying module further comprises:
   a first priority designating module, designating a portion of the demand data, belonging to the order data, as first priority demand data
   an unfinished data designating module, designating a portion of the demand data, not belonging to the order data, as unfinished demand data and designating a portion of the supply data, not belonging to the order data, as unfinished supply data;
   a second priority designating module, designating a portion of the unfinished demand data, belonging to the unfinished supply data, as second priority demand data; and a third priority designating module, designating a portion of the unfinished demand data, not belonging to the unfinished supply data, as third priority demand data.

32. The system as claimed in claim 28, wherein the demand data has at least one demand amount, at least one demand factory, and at least one demand manufacturing technology, the demand factory and the demand manufacturing technology corresponding to the demand amount.

33. The system as claimed in claim 28, wherein the order data has at least one order amount, at least one order factory, and at least one order manufacturing technology, the order factory and the order manufacturing technology corresponding to the order amount.

34. The system as claimed in claim 28, wherein the supply data has at least one supply amount, at least one supply factory, at least one supply manufacturing technology, and at least one supply term, the supply factory, the supply manufacturing technology, and the supply term corresponding to the supply amount.

35. The system as claimed in claim 31, wherein the first priority designating module further comprises:
   a first-first comparing module, comparing the order data with the demand data according to the same order amount and demand amount, the same order factory and demand factory, and the same order manufacturing technology and demand manufacturing technology;
   a second-first comparing module, comparing the order data with the demand data according to the same order amount and demand amount, the different order factory and demand factory, and the same order manufacturing technology and demand manufacturing technology; and
   a third-first comparing module, comparing the order data with the demand data according to the same order amount and demand amount, the same order factory and demand factory, and the different order manufacturing technology and demand manufacturing technology.

36. The system as claimed in claim 31, wherein the second priority designating module further comprises:
   a first-second comparing module, comparing the unfinished demand data with the unfinished supply data according to the same demand amount and supply amount, the same demand factory and supply factory, the same demand manufacturing technology and supply manufacturing technology, and the same supply term and allocation term;
   a second-second comparing module, comparing the unfinished demand data with the unfinished supply data according to the same demand amount and supply amount, the different demand factory and supply factory, the same demand manufacturing technology and supply manufacturing technology, and the same supply term and allocation term;
   a third-second comparing module, comparing the unfinished demand data with the unfinished supply data according to the same demand amount and supply amount, the same demand factory and supply factory, the same demand manufacturing technology and supply manufacturing technology, and the different supply term and allocation term; and
   a fourth-second comparing module, comparing the unfinished demand data with the unfinished supply data according to the same demand amount and supply amount, the same demand factory and supply factory, the different demand manufacturing technology and supply manufacturing technology, and the same supply term and allocation term.

37. The system as claimed in claim 31, wherein the third priority designating module further comprises:
   a first-third comparing module, comparing the unfinished demand data with the unfinished supply data according to the same demand amount and supply amount, the same demand factory and supply factory, the same demand manufacturing technology and supply manufacturing technology, and the same supply term and allocation term;
   a second-third comparing module, comparing the unfinished demand data with the unfinished supply data according to the same demand amount and supply amount, the different demand factory and supply factory, the same demand manufacturing technology and supply manufacturing technology, and the same supply term and allocation term;
   a third-third comparing module, comparing the unfinished demand data with the unfinished supply data according to the same demand amount and supply amount, the same demand factory and supply factory, the same demand manufacturing technology and supply manufacturing technology, and the different supply term and allocation term; and
   a fourth-third comparing module, comparing the unfinished demand data with the unfinished supply data according to the same demand amount and supply amount, the same demand factory and supply factory, the different demand manufacturing technology and supply manufacturing technology, and the same supply term and allocation term.

38. The computer-implemented method as claimed in claim 1, wherein the allocation term is one month.

39. The computer-implemented method as claimed in claim 1, wherein the method classifies the demand data for a plurality of allocation terms.

40. The storage medium as claimed in claim 10, wherein the computer program provides a method of classifying data for a plurality of allocation terms.

41. The system as claimed in claim 31, wherein the allocation term is one month.

* * * * *